(12) United States Patent
Koesterich

(10) Patent No.: US 8,118,317 B2
(45) Date of Patent: Feb. 21, 2012

(54) CONVERTIBLE LUGGAGE CARRIER

(76) Inventor: Jeffrey Koesterich, Teaneck, NJ (US)

( * ) Notice: Subject to any disclaimer, the term of this patent is extended or adjusted under 35 U.S.C. 154(b) by 19 days.

(21) Appl. No.: 12/577,797

(22) Filed: Oct. 13, 2009

(65) Prior Publication Data

US 2010/0187784 A1 Jul. 29, 2010

Related U.S. Application Data

(60) Provisional application No. 61/147,907, filed on Jan. 28, 2009.

(51) Int. Cl.
*B62B 1/12* (2006.01)

(52) U.S. Cl. ............... 280/37; 280/47.18; 280/47.26; 280/47.34; 280/655

(58) Field of Classification Search .......... 280/37, 280/43.17, 47.18, 47.24, 47.26, 47.34, 655, 280/655.1
See application file for complete search history.

(56) References Cited

U.S. PATENT DOCUMENTS

| 5,374,073 | A | * | 12/1994 | Hung-Hsin | ............... 280/30 |
| 7,051,853 | B2 | | 5/2006 | Brown | |
| 7,334,802 | B2 | * | 2/2008 | Kaplan | ............... 280/47.26 |

* cited by examiner

*Primary Examiner* — J. Allen Shriver, II
*Assistant Examiner* — Erez Gurari
(74) *Attorney, Agent, or Firm* — L.C. Begin & Associates, PLLC

(57) ABSTRACT

One embodiment of a carrier for carrying articles and luggage may include a case member. The case member may include a container and a lid pivotally attached to the container. The carrier may further include a railing arrangement, which may include a plurality of telescopic members and a plurality of rail members. The plurality of telescopic members may extend from the lid, and may be extended and retracted. The plurality of rail members may be disposed horizontally on the plurality of telescopic members for extending and retracting the plurality of telescopic members. The extension of the plurality of telescopic members may enable the railing arrangement to assume an open position for configuring and defining a confined space above the lid to receive the luggage therein. The carrier may further include a plurality of wheels, which may be coupled to the container for moving the case member and the luggage.

5 Claims, 3 Drawing Sheets

CONVERTIBLE LUGGAGE CARRIER

CROSS-REFERENCE TO RELATED APPLICATIONS

This application claims the benefit of U.S. Provisional Application No. 61/147,907 filed on Jan. 28, 2009, the disclosure of which is incorporated by reference.

FIELD OF THE DISCLOSURE

The present disclosure generally relates to carriers, and more particularly, to a convertible carrier for storing essential articles and carrying luggage.

BACKGROUND OF THE DISCLOSURE

While traveling, individuals may carry bags, suitcases and the like, having their essential articles stored therein. Such bags and suitcases generally include handles and wheels attached thereto. The individuals may pull the handles to transport the bags and suitcases on the wheels from one place to another. Such transportation may be easy, when the number of such bags and suitcases are not that many, but when their number is considerably high, such move may become difficult.

When the number of such bags and suitcases is considerably high, the individuals may have to make multiple trips from one place to another or they may have to be dependent on porters for transporting such bags and suitcases. Making such multiple trips for moving such bags and suitcases may be a tiring and time consuming task. Further, depending on the porters may incur additional costs.

SUMMARY OF THE DISCLOSURE

One embodiment of a carrier for carrying articles and luggage may include a case member. The case member may include a container and a lid pivotally attached to the container for opening and closing the container. The case member may receive the articles therein. Further, the carrier may include a railing arrangement, which may be carried by the case member. The railing arrangement may include a plurality of telescopic members and a plurality of rail members. The plurality of telescopic members may extend vertically in spaced apart relation from a periphery of the lid. The plurality of telescopic members may vertically extend and retract. Further, the plurality of rail members may be disposed horizontally connecting top portions of the plurality of telescopic members. The plurality of rail members may enable vertical extension and retraction of the plurality of telescopic members. Further, the vertical extension of the plurality of telescopic members may enable the railing arrangement to assume an open position for configuring and defining a confined space on the top portion of the lid to receive the luggage therein. Furthermore, the carrier may include a plurality of wheels, which may be coupled to the container for moving the case member and the luggage received in the confined space on the lid.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference, numerals refer to like parts throughout the description of several views of the drawings.

DETAILED DESCRIPTION OF THE DISCLOSURE

The exemplary embodiments described herein in detail for illustrative purposes are subject to many variations in structure and design. It should be emphasized, however, that the present disclosure is not limited to a particular convertible luggage carrier, as shown and described. It is understood that various omissions and substitutions of equivalents are contemplated as circumstances may suggest or render expedient, but these are intended to cover the application or embodiment without departing from the spirit or scope of the claims of the present disclosure. In addition, it is to be understood that the phraseology and terminology used herein are for the purpose of description and should not be regarded as limiting.

The term "first," "second," and the like, herein do not denote any order, elevation or importance, but rather are used to distinguish placement of one element over another. Further, the terms "a" and "an" herein do not denote a limitation of quantity, but rather denote the presence of at least one of the referenced item.

Figure 1:
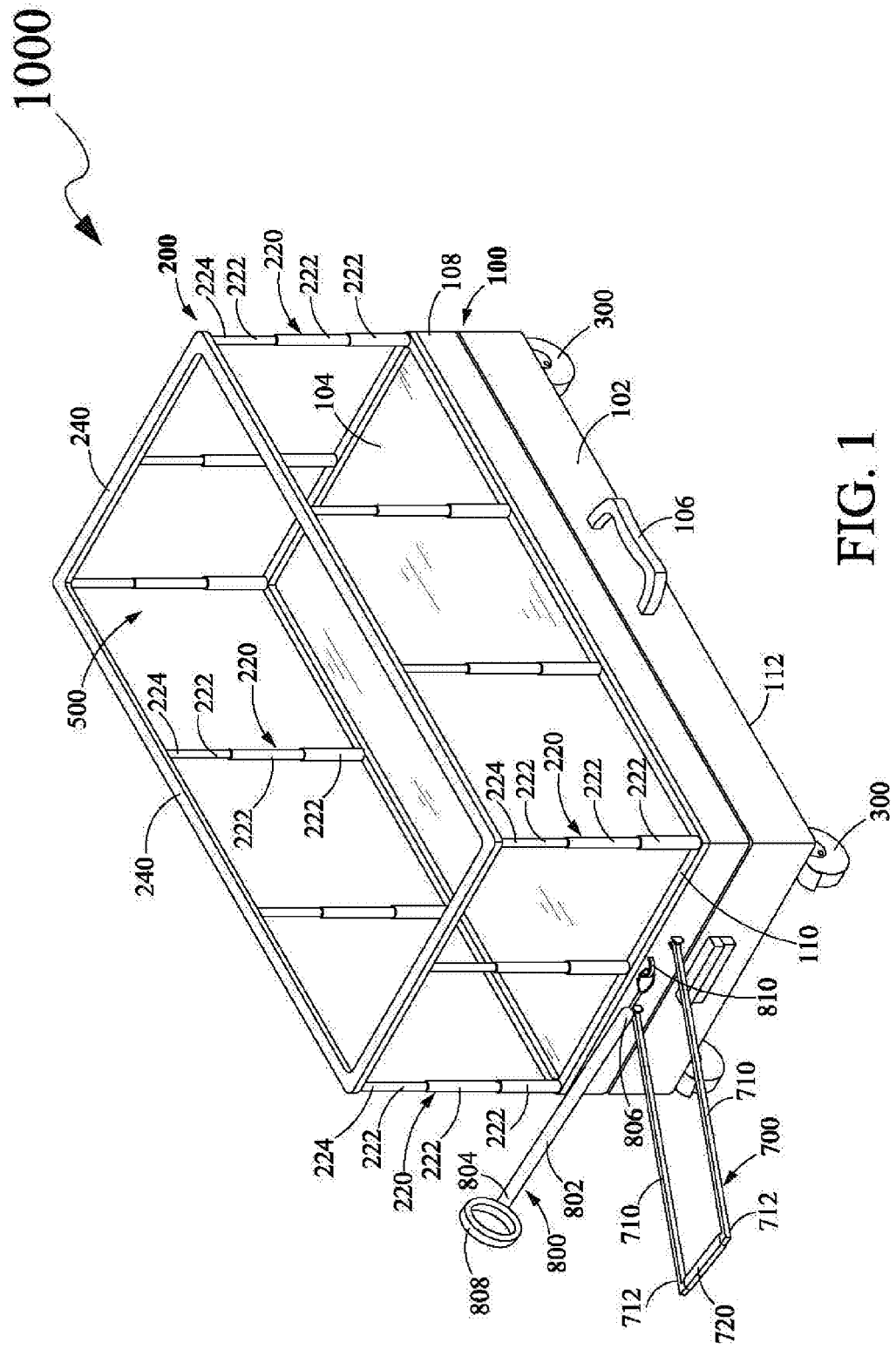
FIG. 1 is a perspective view of an embodiment of a convertible luggage carrier in extended state.
Figure 2:
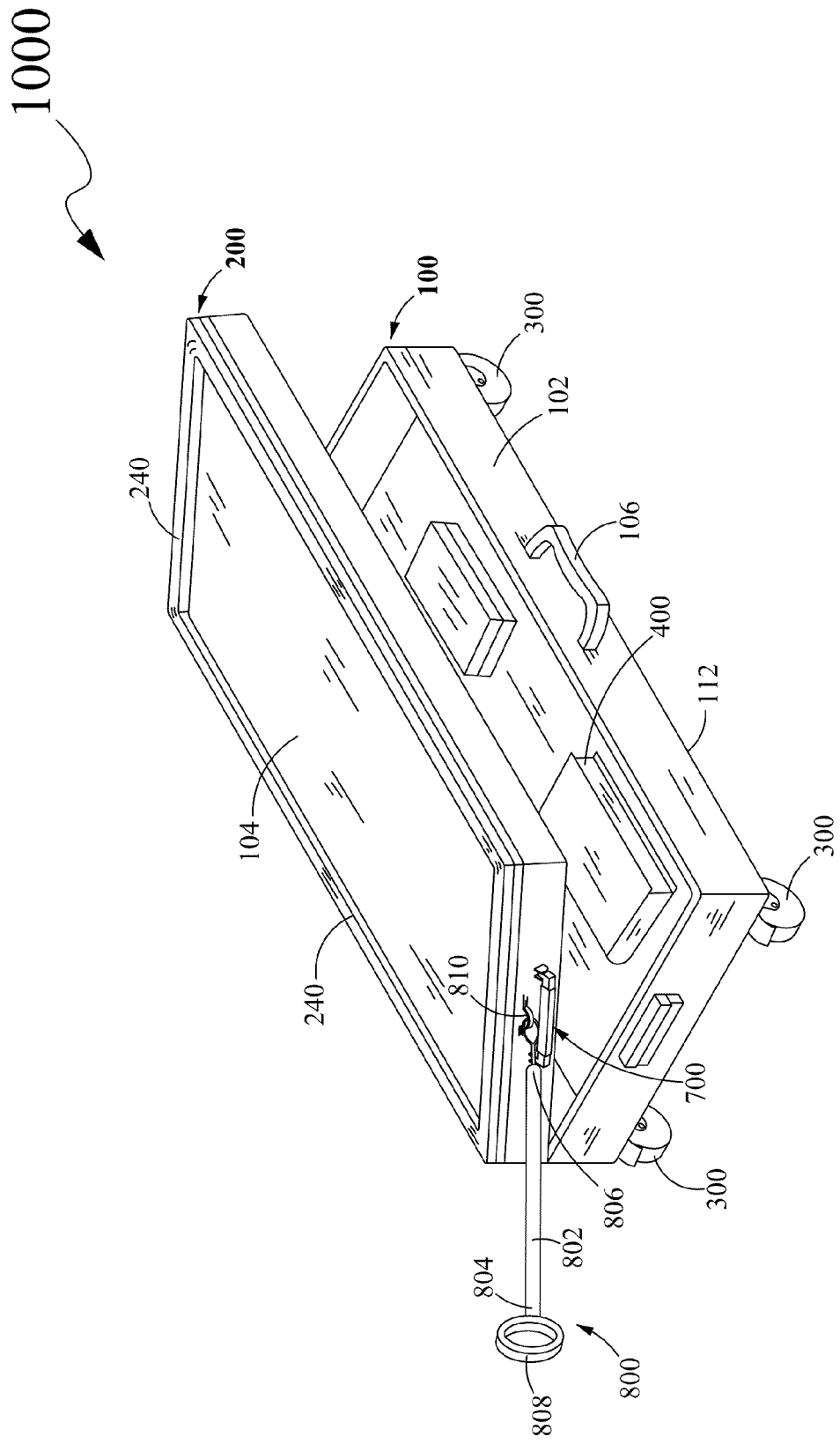
FIG. 2 is a perspective view of the convertible luggage carrier of FIG. 1 with the railing members in retracted state.

Referring now to FIGS. 1 and 2, one embodiment of a convertible luggage carrier 1000 (hereinafter referred to as 'carrier 1000') may include a case member 100. The case member 100 may include a container 102 and a lid 104 pivotally attached to the container 102. The container 102 may be capable of receiving articles 400, and the lid 104 may be capable of covering the articles 400 in the container 102. The articles 400 may include, but not limited to, clothes, books and other essential belongings. The lid 104 may be pivotally coupled to the container 102 by a hinge (not shown) as known in the art. The lid 104 may be rotated around the hinge for opening and closing the container 102 to access and store the articles 400. The case member 100 may further include a handgrip 106 attached to the container 102 for handling the case member 100.

Further, the carrier 1000 may include a railing arrangement 200, which may be carried by the case member 100. The railing arrangement 200 may include a plurality of telescopic members 220. The plurality of telescopic members 220 may be disposed on a periphery 108 of the lid 104. The plurality of telescopic members 220 may extend vertically from a peripheral member 110 disposed on the periphery 108 of the lid 104 in a spaced apart manner from each other. The plurality of telescopic members 220 may be vertically extended and retracted. In one embodiment, each of the plurality of telescopic members 220 may include a plurality of varying sized tubular members 222 snugly disposed within one another. The plurality of tubular members 222 may be received within one another for retracting the plurality of telescopic members 220, and may be extended with respect to one another for stretching out the plurality of telescopic members 220. Further, the tubular members 222 of each of the plurality of telescopic members 220 that extend from the peripheral member 108 may be received within the lid 104 such that, a plurality of rail members 240 may be rested on the lid 104.

Figure 3:
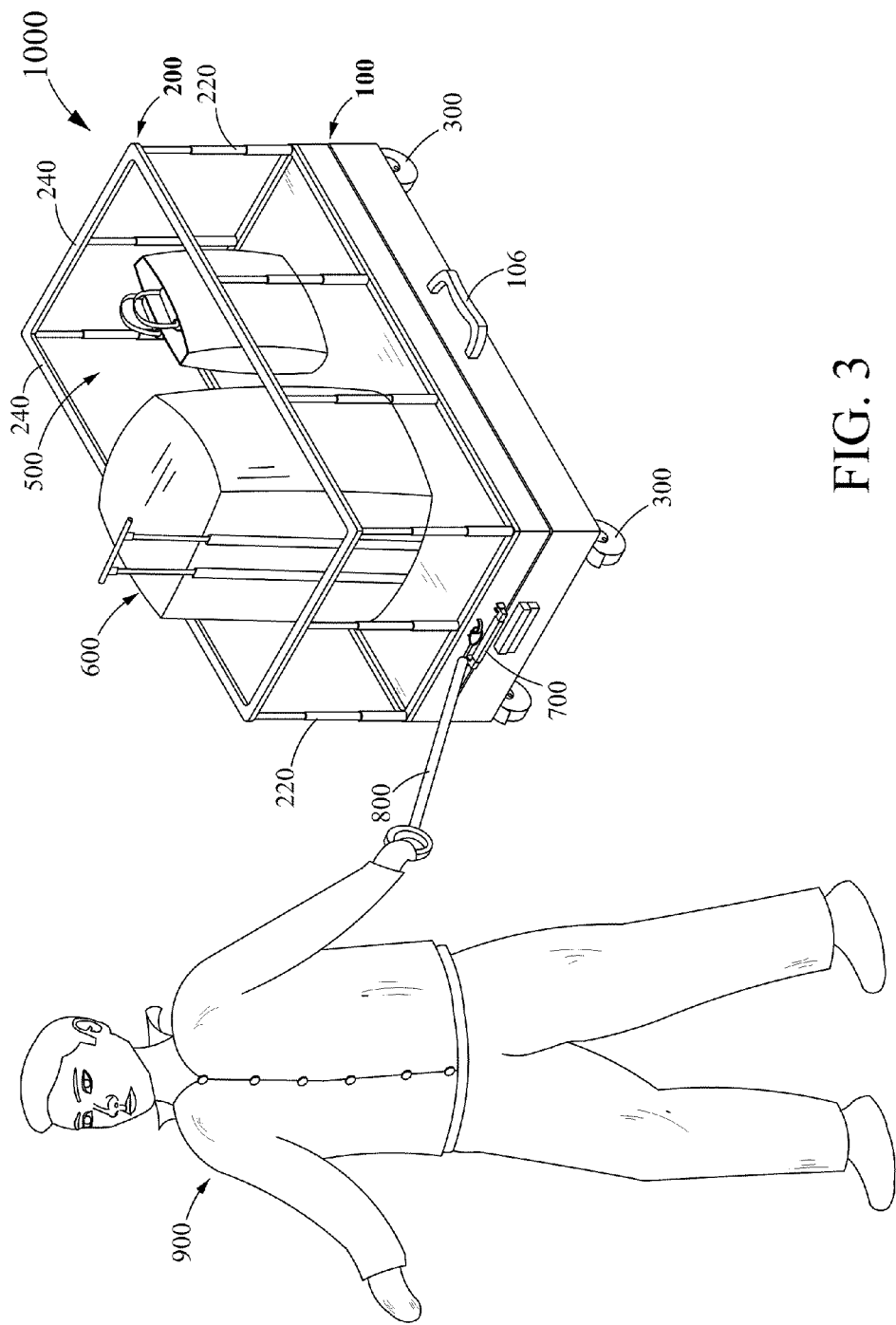
FIG. 3 is a perspective view of the convertible luggage carrier of FIG. 1 in utilized state.

Further, the railing arrangement 200 may include a plurality of rail members 240, which may be disposed horizontally at top portions 224 of the plurality of telescopic members 220. The plurality of rail members 240 may enable extension and retraction of the plurality of telescopic members 220. Specifically, the plurality of rail members 240 may be manually pulled or pushed for extension and retraction of the plurality of telescopic members 220, respectively. Upon extension of the plurality of telescopic members 220 by using the plurality of rail members 240, the railing arrangement 200 may assume an open position (as shown in FIG. 1) for configuring and defining a confined space 500 above the lid 104, which may receive a luggage 600 (as shown in FIG. 3) therein.

Furthermore, the carrier 1000 may include a plurality of wheels 300, which may be coupled to the container 102 of the case member 100. The plurality of wheels 300 may be rotatably coupled to a bottom surface 112 of the container 102, as known in the art. The plurality of wheels 300 may be rotated on a surface for moving the case member 100 and the railing arrangement 200 disposed on the case member 100.

Additionally, the carrier 1000 may include a handle 700, which may facilitate maneuvering of the carrier 1000 on the plurality of wheels 300 from one place to another. The handle 700 may be carried by the case member 100. The handle 700 may be attached to the lid 104 of the case member 100. The handle 700 may include a pair of retractable elongated bars 710 and a transverse bar 720. The pair of retractable elongated bars 710 may be disposed in a spaced apart configuration and attached to the lid 104 at their respective ends, and the transverse bar 720 may be disposed at free end portions 712 of the pair of retractable elongated bars 710. To maneuver the carrier 1000, the handle 700 may be extended (as shown in FIG. 1) otherwise, it may remain retracted (as shown in FIG. 2).

The carrier 1000 may further include a strap handle 800, which may also facilitate maneuvering of the carrier 1000 on the plurality of wheels 300 from one place to another. The strap handle 800 may be carried by the case member 100. The strap handle 800 may include an elongated strap 802 having a first end portion 804 and a second end portion 806 opposite to the first end portion 804. The first end portion 804 may include a loop 808 for griping the strap handle 800 by an individual 900 (as shown in FIG. 3). The second end portion 806 may be fastened to the lid 104 in a slot 810 configured on the lid 104, which may removably attach the strap handle 800 to the case member 100. The handle 700 and the strap handle 800 may be used interchangeably for maneuvering the carrier 1000 on the plurality of wheels 300 from one place to another.

Referring now to FIG. 3, one embodiment of the carrier 1000 in utilized state is shown. Herein reference of FIG. 1 and FIG. 2 will be taken to describe the carrier 1000 in utilized state. The carrier 1000 may be used for carrying the articles 400 as well the luggage 600 at the same time. Specifically, the carrier 1000 may be used for carrying the articles 400 upon storing the articles 400 within the case member 100. Further, upon requirement, the carrier 1000 may also carry the luggage 600 within the confined space 500 that may be configured above the lid 104 by the railing arrangement 200.

For carrying the luggage 600, the plurality of rail members 240 may be manually lifted, which may extend the plurality of telescopic members 220 for configuring and defining the confined space 500 by the railing arrangement 200, and accordingly, the luggage 600 may be placed within the confined space 500. Thereafter, one of the handle 700 and the strap handle 800 may be grabbed by the individual 900 for maneuvering the carrier 1000 on the plurality of wheels 300 from one place to another. Alternatively, the carrier 1000 may be maneuvered manually by pushing or pulling the carrier 1000 upon grabbing the railing arrangement 200. Further, the luggage 600 may be removed from the confined space 500 upon reaching a desired destination. The plurality of telescopic members 220 may be manually pushed to retract, thereby resting the railing arrangement 200 on the lid 104.

A convertible luggage carrier, such as the carrier 1000, may be advantageous in storing essential articles, such as clothes, books and the like, therein, and at the same time may be capable being expanded for receiving various luggage therein, which may facilitate individuals to conveniently transport various luggage and articles at the same time from one place to another, such as at airports, stations and the like.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A carrier for carrying articles and luggage, the carrier comprising:
    a case member having a container and a lid pivotally attached to the container; and
    a railing arrangement carried by the case member, the railing arrangement including a plurality of telescoping members extendable in spaced apart manner from a periphery of the lid, and a plurality of rail members disposed at top portions of the plurality of telescoping members, wherein the telescoping members define a multi-sided enclosure above the lid when the telescoping members are extended, and wherein the enclosure is configured for confining luggage received therein, wherein the telescoping members are retractable into the lid, and wherein the rail members rest on the lid when the telescoping members are retracted into the lid.

2. A carrier for carrying articles and luggage, the carrier comprising:
    a case member having a container and a lid pivotally attached to the container for opening and closing the container, the case member capable of receiving the articles;
    a railing arrangement carried by the case member, the railing arrangement comprising:
    a plurality of telescopic members extending in spaced apart manner from a periphery of the lid, wherein the telescopic members are capable of being extended from and retracted within each other;
    a plurality of rail members disposed at top portions of the plurality of telescopic members, the rail members facilitate extension and retraction of the plurality of telescopic members, wherein extension of the telescopic members enable the railing arrangement to assume an open position for configuring and defining a confined space above the lid to receive luggage therein; and
    a plurality of wheels coupled to a portion of the container, wherein the plurality of wheels facilitate moving of the case member and the luggage received within the confined space configured above the lid,
    wherein the telescopic members are retractable into the lid, and wherein the rail members rest on the lid when the telescopic members are retracted into the lid.

3. The carrier of claim 1 further comprising a handle carried by the case member for maneuvering of the carrier.

4. The carrier of claim 3, wherein the handle is retractable.

5. The carrier of claim 2 further comprising a strap handle carried by the case member for maneuvering of the carrier.

* * * * *